(12) United States Patent
Yang et al.

(10) Patent No.: US 10,427,549 B2
(45) Date of Patent: Oct. 1, 2019

(54) ALIGNING AND MATCHING SYSTEM AND METHOD FOR WIRELESS CHARGING OF AUTOMOBILE

(71) Applicant: Xiamen Newyea Science And Technology Co., Ltd., Xiamen, Fujian (CN)

(72) Inventors: Ruicong Yang, Xiamen (CN); Guijiang Lin, Xiamen (CN); Jianping Liao, Xiamen (CN); Yushan Liu, Xiamen (CN); Binxu Shen, Xiamen (CN); Fengbing Yang, Xiamen (CN); Lianfeng Ren, Xiamen (CN)

(73) Assignee: XIAMEN NEWYEA SCIENCE AND TECHNOLOGY CO., LTD., Xiamen, Fujian (CN)

( * ) Notice: Subject to any disclaimer, the term of this patent is extended or adjusted under 35 U.S.C. 154(b) by 0 days.

(21) Appl. No.: 16/003,715

(22) Filed: Jun. 8, 2018

(65) Prior Publication Data
US 2018/0290550 A1 Oct. 11, 2018

Related U.S. Application Data

(63) Continuation of application No. PCT/CN2016/075848, filed on Mar. 8, 2016.

(30) Foreign Application Priority Data

Jan. 20, 2016 (CN) .......................... 2016 1 0034847

(51) Int. Cl.
B60L 53/39 (2019.01)
H02J 50/10 (2016.01)
(Continued)

(52) U.S. Cl.
CPC ............. *B60L 53/39* (2019.02); *B60L 53/126* (2019.02); *B60L 53/37* (2019.02); *H02J 7/025* (2013.01);
(Continued)

(58) Field of Classification Search
CPC .. H02J 5/005; H02J 7/025; H02J 17/00; H02J 50/10; H02J 50/12; H02J 50/90; B60L 53/39; B60L 53/37; B60L 53/126
See application file for complete search history.

(56) References Cited

U.S. PATENT DOCUMENTS

2010/0237709 A1* 9/2010 Hall ........................ B60L 53/52
307/104
2014/0217966 A1* 8/2014 Schneider ............... H02J 7/025
320/108

* cited by examiner

*Primary Examiner* — David V Henze-Gongola
(74) *Attorney, Agent, or Firm* — Muncy, Geissler, Olds & Lowe, P.C.

(57) ABSTRACT

A wireless charging receiver which includes a wireless receiving panel provided with a receiving coil, and an aligning detection module including a first magnetic sensor chip array and a first solenoid set, is disposed on the lower portion of an electric automobile. A wireless charging transmitter comprises a wireless transmitting panel provided with a transmitting coil, a matching detection module including a photosensitive chip array, a second magnetic sensor chip array and a second solenoid set, and a driving device used for driving the wireless transmitting panel to move, is disposed on the ground of a parking area. Magnetic sensor chips of the first magnetic sensor chip array and solenoids of the first solenoid set are disposed around the receiving coil. The wireless charging transmitter. The wireless transmitting panel is disposed on the driving device and is driven by the driving device to be moved and aligned.

9 Claims, 7 Drawing Sheets

(51) Int. Cl.
*H02J 50/90* (2016.01)
*H02J 7/02* (2016.01)
*B60L 53/37* (2019.01)
*B60L 53/126* (2019.01)
(52) U.S. Cl.
CPC .............. *H02J 50/10* (2016.02); *H02J 50/90* (2016.02); *Y02T 10/7005* (2013.01); *Y02T 90/125* (2013.01); *Y02T 90/16* (2013.01)

ALIGNING AND MATCHING SYSTEM AND METHOD FOR WIRELESS CHARGING OF AUTOMOBILE

CROSS-REFERENCE TO RELATED APPLICATIONS

This application is a Bypass Continuation of International Application No. PCT/CN2016/075848, filed Mar. 8, 2016, which claims the benefit of Chinese Patent Application No. 201610034847.0, filed Jan. 20, 2016, all of which are hereby incorporated by reference as if fully set forth herein.

BACKGROUND OF THE INVENTION

Technical Field

The invention relates to the technical field of wireless charging, in particular to an aligning and matching system and method for wireless charging of an automobile, adopting photosensitive sensors and magnetic sensors.

Description of Related Art

In the prior art, when a wirelessly rechargeable electric automobile pulls into a wireless charging station to be charged, in order to ensure the maximum charging efficiency, a wireless charging receiving panel at the bottom of the automobile needs to be aligned to a wireless charging transmitting panel on the ground. As for an existing aligning method, the driver controls an automobile according to a location mark of a charging station so as to achieve location and alignment, or moves the automobile according to a location instruction of a vehicle-mounted electronic indication system, or controls a charging receiving panel to be aligned to a wireless charging transmitting panel. However, no matter which above-mentioned method is adopted, manual control by the driver is needed to align the wireless transmitting panel and the wireless receiving panel, consequentially, the process is slow, and efficiency is low.

On account of this, an invention patent with the application No. 201110276928.9 discloses an electric automobile wireless charging device based on strong electromagnetic coupling. The electric automobile wireless charging device based on strong electromagnetic coupling comprises a mains supply, a primary rectifier filter, a primary converter, a primary side coil of a separable electromagnetic coupler, a movable primary side coil support, a secondary side coil of the separable electromagnetic coupler, a magnetism gathering iron core, a movable secondary side coil support, a secondary rectifier filter, a charging controller, a storage battery and an electric automobile. Power-frequency alternating currents are input to the primary rectifier filter, stable direct currents are output from the primary rectifier filter, high-frequency alternating currents obtained through high-frequency inversion and conversion by the primary converter are transmitted to the primary side coil of the separable electromagnetic coupler, the magnetism gathering iron core is arranged in the primary side coil of the detachable electromagnetic coupling, the primary side coil of the separable electromagnetic coupler can move up and down through the movable primary side coil support to be strongly electromagnetically coupled with the secondary side coil of the separable electromagnetic coupler through upward or downward movement of the movable secondary side coil support, and thus energy is transmitted at a high magnetic density. In this patent, the primary side coil and the secondary side coil which can move up and down are adopted, after the automobile is moved to align the secondary side coil on the automobile to the primary side coil below, the primary side coil and the secondary side coil are moved upwards or downwards to be close to each other, and thus power conversion efficiency is improved. However, this patent has the following disadvantages: the driver has to move the automobile to align the secondary side coil to the primary side coil to meet the precondition of this patent, and since the device is moved upwards or downwards, after being charged at the charging station, the automobile has to wait for a period of time during which the primary side coil and the secondary side coil retract back to original positions and then leaves the charging station, and consequentially, the whole automobile charging process and time are prolonged, and scratch damage to the primary side coil and the secondary side coil possibly caused if the driver moves the automobile too early is avoided.

Another invention patent with the application No. 201080058025.7 discloses a wireless charging system and method for an electric automobile. The wireless charging system comprises a power control device disposed in a wireless charging station and used for controlling all wireless power transmission devices, a plurality of wireless power transmission devices disposed in a parking area, a near field wireless communication module on the ground, and a plurality of liftable wireless transmission panels installed at the bottom of the electric automobile. The wireless power transmission devices are disposed on the ground of the parking area and selectively enable the wireless transmission panels corresponding to the charging information of the electric automobile to operate. A wireless power receiver, a wireless charging terminal, a near field wireless communication module and a charging controller are disposed in the electric automobile. The driver makes a selection through the wireless charging terminal to achieve optimal wireless charging. In this patent, a plurality of receiving coils are disposed at the bottom of the automobile, after the automobile is parked in the parking area, the driver selects the optimal receiving panel to achieve optimal wireless charging. On the aspect of optimal positioning of a transmitter and a receiver, this patent has the following defects: firstly, the suitable receiving panel needs to be manually selected by the driver, and secondly, multiple receiving panels are disposed at the bottom of the automobile, resulting in a high cost.

Another invention patent with the application No. 201310043965.4 discloses a wireless charging system for an electric automobile, which solves the problem of difficult connection and matching of the primary side coil and the secondary side coil in the prior art. The wireless charging system for the electric automobile comprises a wireless transmitting panel and a wireless receiving panel and further comprises a supporting platform for parking the electric automobile and a supporting assembly used for supporting the wireless transmitting panel. The wireless receiving panel is disposed at the bottom of the electric automobile, and the receiving surface of the wireless receiving panel faces downwards. At least one position adjustment mechanism capable of adjusting the height of the wireless transmitting panel is disposed between the supporting assembly and the supporting platform. The height of the wireless transmitting panel can be rapidly adjusted according to the position of the automobile to shorten the distance between the wireless transmitting panel and the wireless receiving panel is shortened, so that power transmission loss caused by misalignment of the automobile and the wireless transmitting panel is effectively reduced, energy transmission efficiency is improved, and radiation is reduced accordingly. According to this patent, the movable wireless charging transmitting panel is adopted and aligned to the receiving panel to improve the wireless charging transmission efficiency. However, this patent has the following defects: a huge groundbreaking project on the ground of the parking area is needed for the movable transmitting panel, and a space which is big enough to allow the movable transmitting panel to be embedded therein needs to be dug, for instance, a metal frame structure used as a supporting surface increases the cost of the whole system; and the supporting surface of the metal frame structure is possibly heated by electromagnetic waves adsorbed by metal.

BRIEF SUMMARY OF THE INVENTION

Thus, to solve the problems mentioned above, the invention provides an aligning and matching method and system for wireless charging of an automobile, adopting photosensitive sensors and magnetic sensors. The detection and positioning method based on photosensitive sensors and magnetic sensors is convenient to implement, efficient, low in cost and free of manual intervention, thereby overcoming the defects of the prior art.

The scheme adopted by the invention to solve the above technical problems is as follows: Photosensitive sensors and magnetic sensors are used for detection, and a driving device (a stepping motor positioning system) is controlled to drive a ground wireless charging transmitting panel to be aligned to a vehicle-mounted wireless charging receiving panel. Photosensitive sensor chips are used for periodically and regularly detecting whether or not an automobile is parked over a wireless charging panel. The detection and positioning method based on magnetic sensors is adopted to automatically and rapidly position and align the ground wireless charging transmitting panel and the vehicle-mounted wireless charging receiving panel, so that the wireless charging speed is increased, and electric automobiles can be charged more intelligently, conveniently and efficiently.

Specifically, the following technical scheme is adopted by the invention. An aligning and matching system for wireless charging of an automobile comprises a wireless charging receiver disposed on the lower portion of an electric automobile and a wireless charging transmitter disposed on the ground of a parking area. The wireless charging receiver establishes communication with the wireless charging transmitter within a certain distance, and wireless power transmission is started automatically.

The wireless charging receiver comprises a wireless receiving panel and an aligning detection module. The wireless receiving panel is provided with a receiving coil. The aligning detection module comprises a first magnetic sensor chip array composed of a plurality of magnetic sensor chips and a first solenoid set composed of a plurality of solenoids for generating magnetic fields. The magnetic sensor chips of the first magnetic sensor chip array and the solenoids of the first solenoid set are disposed around the receiving coil.

The wireless charging transmitter comprises a wireless transmitting panel and a driving device for driving the wireless transmitting panel to move. Wherein, the wireless transmitting panel is provided with a transmitting coil. A matching detection module comprises a photosensitive sensor chip array composed of a plurality of photosensitive sensor chips, a second magnetic sensor chip array composed of a plurality of magnetic sensor chips, and a second solenoid set composed of a plurality of solenoids for generating magnetic fields. The wireless transmitting panel is disposed on the driving device and is driven by the driving device to move, for instance, the wireless transmitting panel can move forwards, backwards, leftwards and rightwards and can clockwise and anticlockwise rotate by 15°. The magnetic sensor chips of the first magnetic sensor chip array and the magnetic sensor chips of the second magnetic sensor chip array only allow magnetic force lines in the vertical direction to pass through. The photosensitive sensor chips of the photosensitive sensor chip array only allow light in the vertical direction to pass through.

As a simple feasible scheme, the driving device comprises a transverse and longitudinal rail, and the wireless transmitting panel is movably disposed on the transverse and longitudinal rail and is driven by the driving device to transversely and longitudinally move on the transverse and longitudinal rail.

As a simple feasible scheme, the driving device comprises a plurality of drive motors separately installed around the wireless transmitting panel. Preferably, the driving device is realized by a plurality of drive motors, and at least one of the drive motors is a fine-adjustment drive motor.

In order to achieve detection conveniently, in the aligning detection module, the first magnetic sensor chip array at least comprises four magnetic sensor chips separately marked as a first magnetic sensor chip, a second magnetic sensor chip, a third magnetic sensor chip and a fourth magnetic sensor chip, and the first magnetic sensor chip, the second magnetic sensor chip, the third magnetic sensor chip and the fourth magnetic sensor chip are clockwise disposed around the receiving coil. The first solenoid set at least comprises four solenoids separately marked as a first solenoid, a second solenoid, a third solenoid and a fourth solenoid, and the first solenoid, the second solenoid, the third solenoid and the fourth solenoid are separately spaced from the first magnetic sensor chip, the second magnetic sensor chip, the third magnetic sensor chip and the fourth magnetic sensor chip.

In the aligning detection module, the first magnetic sensor chip, the second magnetic sensor chip, the third magnetic sensor chip and the fourth magnetic sensor chip can be single chips and can also be chip arrays composed of a plurality of chips. Theoretically, the aforesaid function of the invention can be achieved simply through single chips, but in order to achieve better and rapider alignment, the first magnetic sensor chip, the second magnetic sensor chip, the third magnetic sensor chip and the fourth magnetic sensor chip are all chip arrays.

To achieve detection more conveniently and accurately, the first solenoid and the third solenoid generate magnetic fields of the same polarity (such as N-pole magnetic fields), the second solenoid and the fourth solenoid generate magnetic fields of the same polarity (such as S-polar magnetic fields), and the first solenoid and the second solenoid generate magnetic fields of different polarities. Meanwhile, the first magnetic sensor chip and the third magnetic sensor chip are used for detecting magnetic fields of the same polarity (such as S-pole magnetic fields), and the second magnetic sensor chip and the fourth magnetic sensor chip are used for detecting magnetic fields of the same polarity (such as N-pole magnetic fields).

Similarly, in the matching detection module, the second magnetic sensor chip array at least comprises four magnetic sensor chips separately marked as a fifth magnetic sensor chip, a sixth magnetic sensor chip, a seventh magnetic sensor chip and an eighth magnetic sensor chip, and the fifth magnetic sensor chip, the sixth magnetic sensor chip, the seventh magnetic sensor chip and the eighth magnetic sensor chip are clockwise disposed around the transmitting coil in sequence. The second solenoid set at least comprises four solenoids separately marked as a fifth solenoid, a sixth solenoid, a seventh solenoid and an eighth solenoid, and the fifth solenoid, the sixth solenoid, the seventh solenoid and the eighth solenoid are separately spaced from the fifth magnetic sensor chip, the sixth magnetic sensor chip, the seventh magnetic sensor chip and the eighth magnetic sensor chip.

In the matching detection module, the fifth magnetic sensor chip, the sixth magnetic sensor chip, the seventh magnetic sensor chip and the eighth magnetic sensor chip can be single chips and can also be chip arrays composed of a plurality of chips. Theoretically, the aforesaid function of the invention can be achieved simply through single chips, but in order to achieve better and rapider alignment, the fifth magnetic sensor chip, the sixth magnetic sensor chip, the seventh magnetic sensor chip and the eighth magnetic sensor chip are all chip arrays.

Correspondingly, the fifth solenoid and the seventh solenoid generate magnetic fields of the same polarity (such as N-pole magnetic fields), the sixth solenoid and the eighth solenoid generate magnetic fields of the same polarity (such as S-pole magnetic fields), and the fifth solenoid and the sixth solenoid generate magnetic fields of different polarities. Meanwhile, the fifth magnetic sensor chip and the seventh magnetic sensor chip are used for detecting magnetic fields of the same polarity (such as S-pole magnetic fields), the sixth magnetic sensor chip and the eighth magnetic sensor chip are used for detecting magnetic fields of the same polarity (such as N-pole magnetic fields), and the fifth magnetic sensor chip and the sixth magnetic sensor chip are used for detecting magnetic fields of different polarities.

The photosensitive sensor chip array at least comprises four photosensitive sensor chips separately marked as a first photosensitive sensor chip, a second photosensitive sensor chip, a third photosensitive sensor chip and a fourth photosensitive sensor chip, and the first photosensitive sensor chip, the second photosensitive sensor chip, the third photosensitive sensor chip and the fourth photosensitive sensor chip are disposed around the second magnetic sensor chip array and the second solenoid set. The first photosensitive sensor chip, the second photosensitive sensor chip, the third photosensitive sensor chip and the fourth photosensitive sensor chip can be single chips and can also be chip arrays composed of a plurality of chips. Theoretically, the aforesaid function of the invention can be achieved simply through single chips, but in order to achieve better and rapider alignment, the first photosensitive sensor chip, the second photosensitive sensor chip, the third photosensitive sensor chip and the fourth photosensitive sensor chip are all chip arrays.

When arranged, the magnetic sensor chips of the first magnetic sensor chip array are in one-to-one correspondence with the solenoids of the second solenoid set, and magnetic fields detected by the magnetic sensor chips of the first magnetic sensor chip array are identical with magnetic fields generated by the solenoids of the second solenoid set. The magnetic sensor chips of the second magnetic sensor chip array are in one-to-one correspondence with the solenoids of the first solenoid set, and magnetic fields detected by the magnetic sensor chips of the second magnetic sensor chip array are identical with magnetic fields generated by the solenoids of the first solenoid set. In this way, in the detection process, if no magnetic field passes across the magnetic sensor chip arrays, VOUT=H; if a magnetic field passes across any chip of the magnetic sensor chip arrays, VOUT=L; and when VOUT=L, the wireless charging receiver and the wireless charging transmitter are accurately aligned.

An aligning and matching method for wireless charging of an automobile based on the above system comprises the following steps:

Step 1, a wireless charging receiver is disposed at the bottom of an electric automobile, and a wireless charging transmitter is disposed on the ground of a parking area, wherein, the wireless charging receiver comprises a wireless receiving panel and an aligning detection module, the wireless receiving panel is provided with a receiving coil, the aligning detection module comprises a first magnetic sensor chip array composed of a plurality of magnetic sensor chips and a first solenoid set composed of a plurality of solenoids for generating magnetic fields;

the wireless charging transmitter comprises a wireless transmitting panel, a matching detection module and a driving device for driving the wireless transmitting panel to move, the wireless transmitting panel is disposed on the driving device and provided with a transmitting coil, the matching detection module comprises a photosensitive sensor chip array composed of a plurality of photosensitive sensor chips, a second magnetic sensor chip array composed of a plurality of magnetic sensor chips, and a second solenoid set composed of a plurality of solenoids for generating magnetic fields, and the wireless transmitting panel is disposed on the driving device and is driven by the driving device to move to be aligned;

the magnetic sensor chips of the first magnetic sensor chip array and the magnetic sensor chips of the second magnetic sensor chip array only allow magnetic force lines in the vertical direction to pass through, and the photosensitive sensor chips of the photosensitive chip array only allow light in the vertical direction to pass through;

when the wireless charging receiver and the wireless charging transmitter are accurately aligned, the magnetic sensor chips of the first magnetic sensor chip array are in one-to-one correspondence with the solenoids of the second solenoid set, and the magnetic sensor chips of the second magnetic sensor chip array are in one-to-one correspondence with the solenoids of the first solenoid set.

Step 2, the first solenoid set of the aligning detection module generates magnetic fields, and the second solenoid set of the matching detection module generates magnetic fields;

the photosensitive sensor chip array detects whether or not light is shielded currently;

magnetic force line shielding devices are installed on all the magnetic sensor chips, so that only magnetic force lines in the vertical direction are allowed to pass through the magnetic sensor chips;

the second magnetic sensor chip array detects the magnetic fields generated by the first solenoid set, so that whether or not the second magnetic sensor chip array is in one-to-one correspondence with the first solenoid set of the aligning detection module is judged; the first magnetic sensor chip array detects the magnetic fields generated by the second solenoid set, so that whether or not the first magnetic sensor chip array is in one-to-one correspondence with the second solenoid set of the aligning detection module is judged.

Step 3, the driving device drives the wireless transmitting panel to move till the magnetic sensor chips of the first magnetic sensor chip array are in one-to-one correspondence with the solenoids of the second solenoid set and the magnetic sensor chips of the second magnetic sensor chip array are in one-to-one correspondence with the solenoids of the first solenoid set;

According to the above scheme adopted by the invention, in actual use, the driver parks the automobile on the ground of the parking area (the parking space) where the wireless charging transmitter is disposed. The four photosensitive sensor chips (the first photosensitive sensor chip, the second photosensitive sensor chip, the third photosensitive sensor chip and the fourth photosensitive sensor chip) of the photosensitive sensor chip array in the ground wireless charging transmitter regularly detect whether or not an automobile is parked over the ground wireless charging transmitter. If the first photosensitive sensor chip, the second photosensitive sensor chip, the third photosensitive sensor chip and the fourth photosensitive sensor chip detect that an automobile is parked over the ground wireless charging transmitter, this information is fed back to the driver, for instance, 'the automobile can be wirelessly charged now' is displayed on the display screen. After the driver enables the wireless charging function of the vehicle-mounted wireless charging receiver, the four magnetic sensor chips (the first magnetic sensor chip, the second magnetic sensor chip, the third magnetic sensor chip and the fourth magnetic sensor chip) of the magnetic sensor chip array in the wireless charging receiver are enabled to operate, and VOUT=H (a high level is output). The fifth solenoid and the seventh solenoid are powered on to generate N-pole magnetic fields, and the sixth solenoid and the eighth solenoid are powered on to generate S-pole magnetic fields. The drive motors start to move the wireless charging transmitting panel along a track obtained through progressive scanning in the X direction and the Y direction. When the fifth solenoid and the seventh solenoid are aligned to the N-pole magnetic sensor chips of the first magnetic sensor chip array and the sixth solenoid and the eighth solenoid are aligned to the S-pole magnetic sensor chips of the first magnetic sensor chip array, VOUT=L (a lower level is output), the first solenoid and the third solenoid are powered on to generate N-pole magnetic fields, the second solenoid and the fourth solenoid are powered on to generate S-pole magnetic fields, if one of the eighth magnetic sensor chip array, the seventh magnetic sensor chip array, the sixth magnetic sensor chip array and the fifth magnetic sensor chip array meets the condition VOUT=L (a lower level is output), it indicates that alignment is completed, and the drive motors stop operating.

According to the invention, photosensitive sensors are used for detecting automobile parking, magnetic sensors are used for positioning, and the stepping motors are controlled to drive the wireless charging transmitting panel on the ground to be automatically aligned to the vehicle-mounted wireless charging receiving panel. Compared with existing aligning methods based on manual control over automobiles, the invention has the advantage of automatic, rapid and accurate alignment.

DETAILED DESCRIPTION OF THE INVENTION

The invention is further described in combination with the drawings and specific embodiments as follows.

The invention provides an aligning and matching system for wireless charging of an automobile. The aligning and matching system for wireless charging of an automobile comprises a wireless charging receiver 1000 disposed on the lower portion of an electric automobile, a wireless charging transmitter 2000 disposed on the ground of a parking area, a ground wireless charging system 3000 used for processing the whole system flow, and a display screen 4000. The wireless charging receiver 1000 establishes communication with the wireless charging transmitter 2000 within a certain distance, and wireless power transmission is started automatically. The wireless charging receiver 1000 comprises a wireless receiving panel and an aligning detection module. The wireless receiving panel is provided with a receiving coil. The aligning detection module comprises a first magnetic sensor chip array composed of a plurality of magnetic sensor chips and a first solenoid set composed of a plurality of solenoids for generating magnetic fields. The magnetic sensor chips of the first magnetic sensor chip array and the solenoids of the first solenoid set are disposed around the receiving coil. The wireless charging transmitter comprises a wireless transmitting panel, a matching detection module and a driving device for driving the wireless transmitting panel to move. Wherein, the wireless transmitting panel is provided with a transmitting coil. The matching detection module comprises a photosensitive sensor chip array composed of a plurality of photosensitive sensor chips, a second magnetic sensor chip array composed of a plurality of magnetic sensor chips, and a second solenoid set composed of a plurality of solenoids for generating magnetic fields. The wireless transmitting panel is disposed on the driving device and is driven by the driving device to move to be aligned. In this embodiment, the wireless transmitting panel can be moved forwards, backwards, leftwards and rightwards and can be clockwise and anticlockwise rotated by 15°.

Particularly, as a simple scheme, the driving device comprises a transverse and longitudinal rail, and the wireless transmitting panel is movably disposed on the transverse and longitudinal rail and is driven by the driving device to transversely and longitudinally move on the transverse and longitudinal rail. In addition, the driving device further comprises a plurality of motors used for driving the wireless transmitting panel to move on the rail. In this embodiment, the driving device comprises a first drive motor, a second drive motor and a fine-adjustment drive motor. The invention is described in combination with one specific embodiment as follows.

The magnetic force line of a single magnetic sensor chip and the light intensity and density of a single photosensitive sensor chip are limited, which is bad for calibration and alignment. In order to achieve accurate and rapid calibration, the aligning detection module comprises a first magnetic sensor chip array set composed of a plurality of magnetic sensor chip arrays (each magnetic sensor chip array is composed of a plurality of, for instance at least three, magnetic sensor chips) and a first solenoid set composed of a plurality of solenoids for generating magnetic fields. The magnetic sensor chip arrays of the first magnetic sensor chip array set and the solenoids of the first solenoid set are disposed around the receiving coil. The matching detection module comprises a photosensitive sensor chip array set composed of a plurality of photosensitive sensor chip arrays (each photosensitive sensor chip array is composed of a plurality of, for instance at least three, photosensitive sensor chips), a second magnetic sensor chip array set composed of a plurality of magnetic sensor chip arrays, and a second solenoid set composed of a plurality of solenoids for generating magnetic fields.

Figure 1:
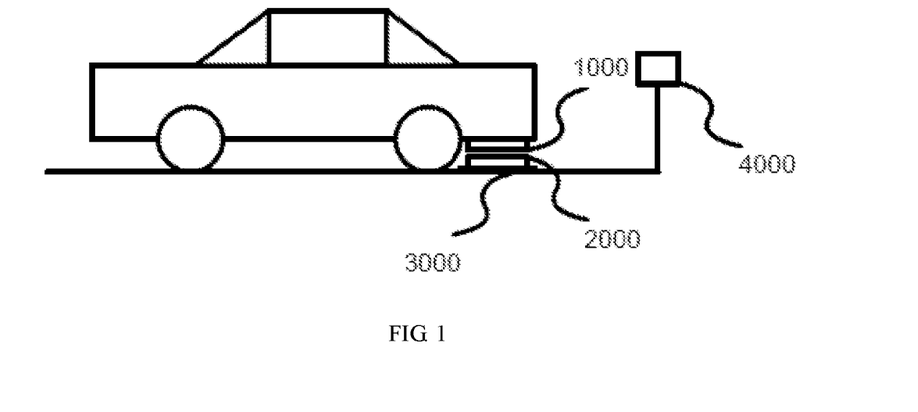
FIG. 1 is a diagram of an automobile and the ground in the embodiment of the invention.

In this embodiment, the first magnetic sensor chip array set (composed of a plurality of magnetic sensor chip arrays) serves as a magnetic sensor chip in the aligning detection module. The photosensitive sensor chip array set (composed of a plurality of photosensitive sensor chip arrays) serves as a photosensitive sensor in the matching detection module, and the second magnetic sensor chip array set (composed of a plurality of magnetic sensor chip arrays) serves as a magnetic sensor chip in the matching detection module. As is shown in FIG. 1 and FIG. 2b, the driver parks the automobile on the ground of the parking area (parking space) where the wireless charging transmitter 2000 is disposed. In the wireless charging transmitter 2000 on the ground, the second magnetic sensor chip array set at least comprises four magnetic sensor chip arrays separately marked as a fifth magnetic sensor chip array 208, a sixth magnetic sensor chip array 206, a seventh magnetic sensor chip array 204 and an eighth magnetic sensor chip array 202. The photosensitive sensor chip array set at least comprises four photosensitive sensor chip arrays separately marked as a first photosensitive sensor chip array 2004, a second photosensitive sensor chip array 2005, a third photosensitive sensor chip array 2006 and a fourth photosensitive sensor chip array 2007. The first photosensitive sensor chip array 2004, the second photosensitive sensor chip array 2005, the third photosensitive sensor chip array 2006 and the fourth photosensitive sensor chip array 2007 are clockwise disposed around the transmitting coil 200 in sequence and regularly detect whether or not an automobile is parked over the ground wireless charging transmitter 2000. If the first photosensitive sensor chip array 2004, the second photosensitive sensor chip array 2005, the third photosensitive sensor chip array 2006 and the fourth photosensitive sensor chip array 2007 detect that an automobile is parked over the ground wireless charging transmitter 2000, this information is fed back to the driver, for instance, 'the automobile can be wirelessly charged now' is displayed on the display screen 4000.

Figure 2A:
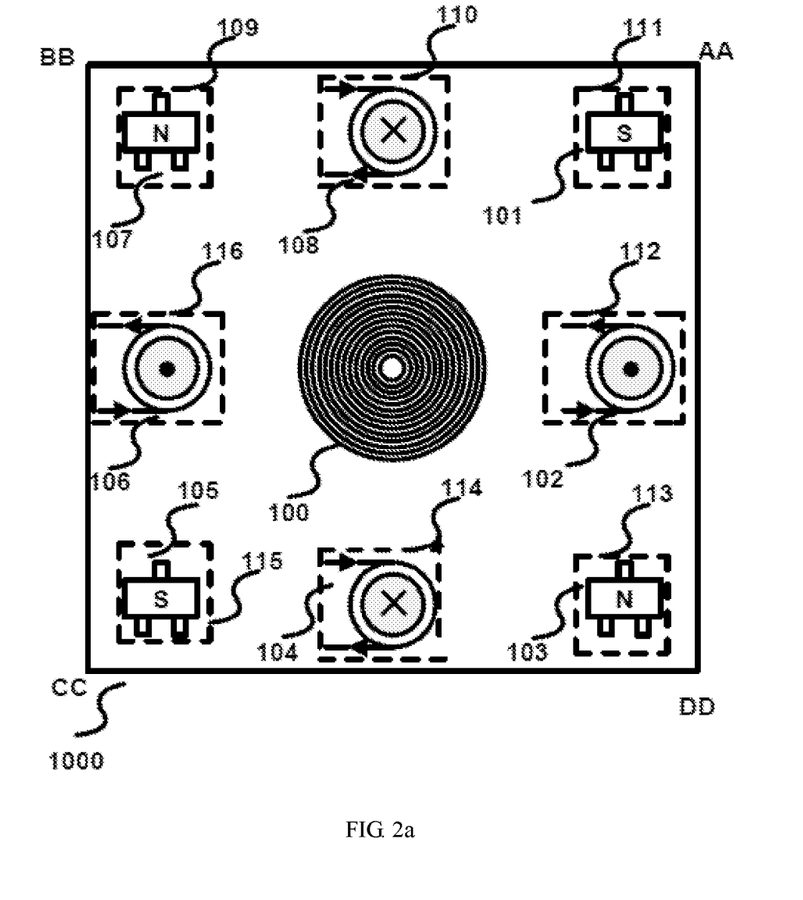
FIG. 2a is a diagram of a wireless charging receiver in the embodiment of the invention.
Figure 2B:
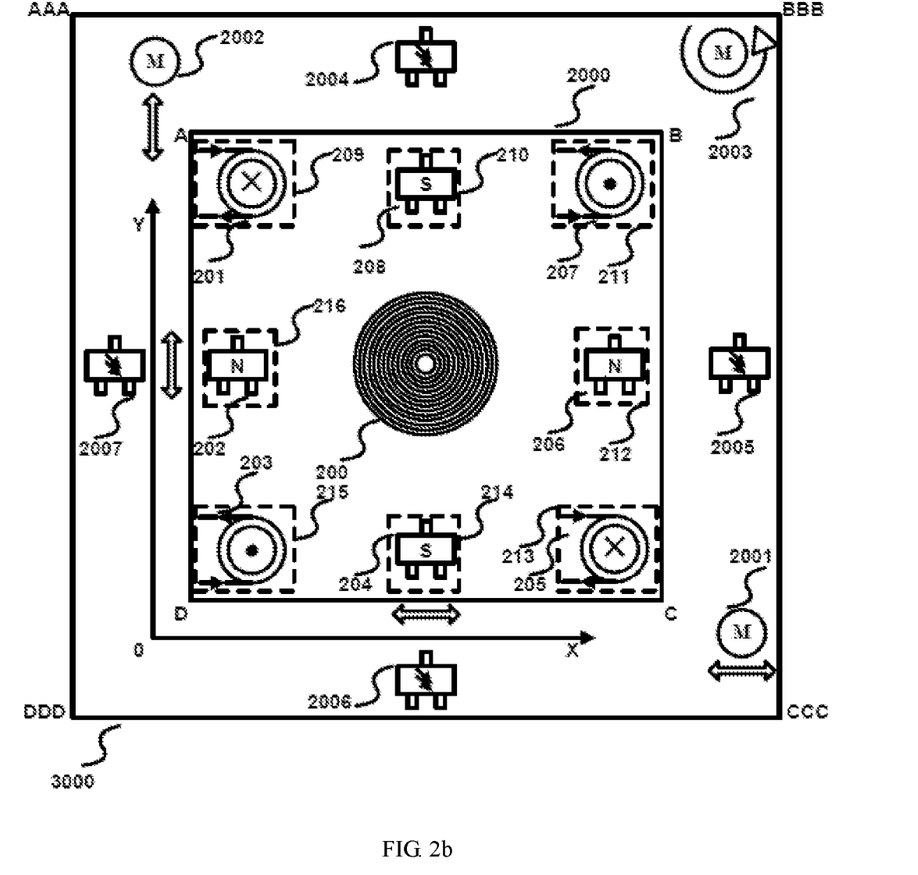
FIG. 2b is a diagram of a wireless charging transmitter in the embodiment of the invention.

As is shown in FIG. 2a, in the wireless charging receiver 1000, the first magnetic sensor chip array set at least comprises four magnetic sensor chip arrays separately marked as a first magnetic sensor chip array 101, a second magnetic sensor chip array 103, a third magnetic sensor chip array 105 and a fourth magnetic sensor chip array 107, and the first magnetic sensor chip array 101, the second magnetic sensor chip array 103, the third magnetic sensor chip array 105 and the fourth magnetic sensor chip array 107 are clockwise disposed around the receiving coil 100. After the driver enables the wireless charging function of the vehicle-mounted wireless charging receiver 1000, the first magnetic sensor chip array 101, the second magnetic sensor chip array 103, the third magnetic sensor chip array 105 and the fourth magnetic sensor chip array 107 are enabled to operate, wherein, VOUT=H (a high level is output).

As is shown in FIG. 2a and FIG. 2b, in this embodiment, the first solenoid set comprises four solenoids separately marked as a first solenoid 102, a second solenoid 104, a third solenoid 106 and a fourth solenoid 108. The second solenoid set comprises four solenoids separately marked as a fifth solenoid 207, a sixth solenoid 205, a seventh solenoid 203 and an eighth solenoid 201.

The eighth solenoid 201 and the sixth solenoid 205 are powered on to generate S-pole magnetic fields, and the seventh solenoid 203 and the fifth solenoid 207 are powered on to generate N-pole magnetic fields. The first drive motor 2001 and the second drive motor 2002 start to move the wireless charging transmitter 2000 along a track obtained through progressive scanning in the X direction and the Y direction.

When the eighth solenoid 201 and the sixth solenoid 205 are aligned to the first magnetic sensor chip array 101 and the third magnetic sensor chip array 105 in the S-pole magnetic sensor chip and the seventh solenoid 203 and the fifth solenoid 207 are aligned to the second magnetic sensor chip array 103 and the fourth magnetic sensor chip array 107 in the N-pole magnetic sensor chip, the first magnetic sensor chip array 101, the second magnetic sensor chip array 103, the third magnetic sensor chip array 105 and the fourth magnetic sensor chip array 107 meet the condition VOUT=L (a low level is output). The first solenoid 102 and the third solenoid 106 are powered on to generate N-pole magnetic fields, and the second solenoid 104 and the fourth solenoid 108 are powered on to generate S-pole magnetic fields. If one of the eighth magnetic sensor chip array 202, the seventh magnetic sensor chip array 204, the sixth magnetic sensor chip array 206 and the fifth magnetic sensor chip array 208 meets the condition VOUT=L (a low level is output), the first drive motor 2001 and the second drive motor 2002 stop operating.

Figure 4A:
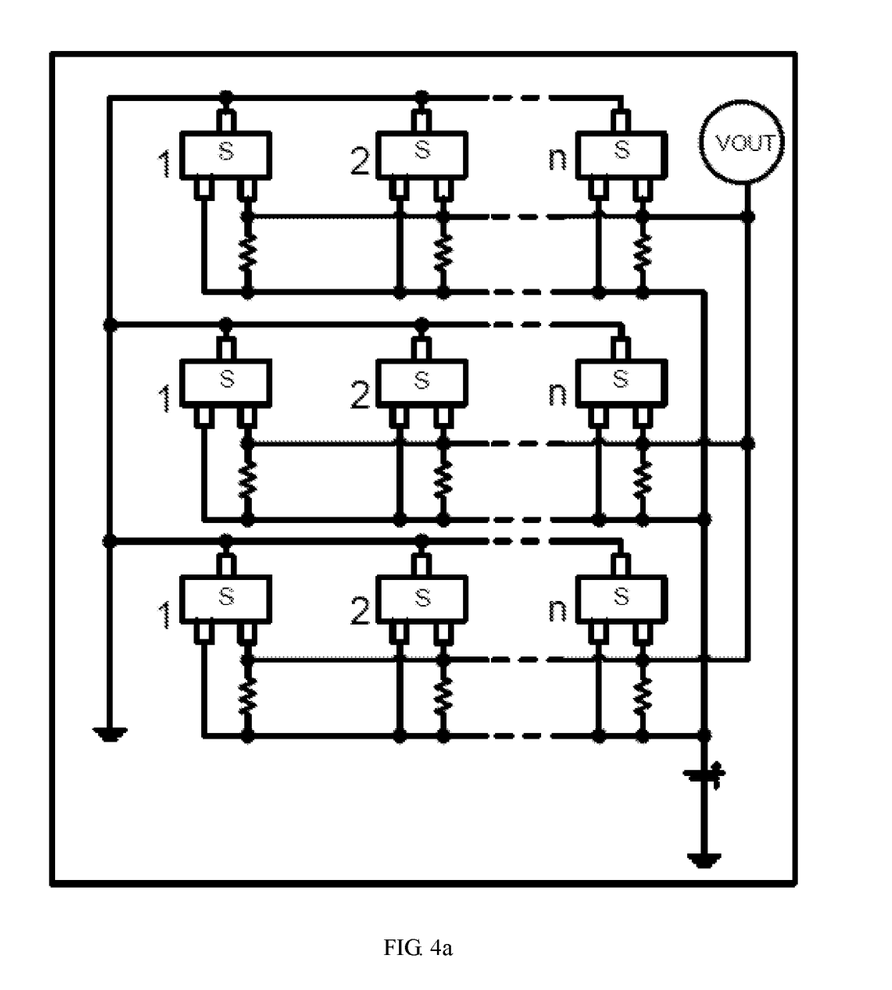
FIG. 4a is a diagram of magnetic sensor chip arrays (only detecting S-pole magnetic fields) in the embodiment of the invention.
Figure 4B:
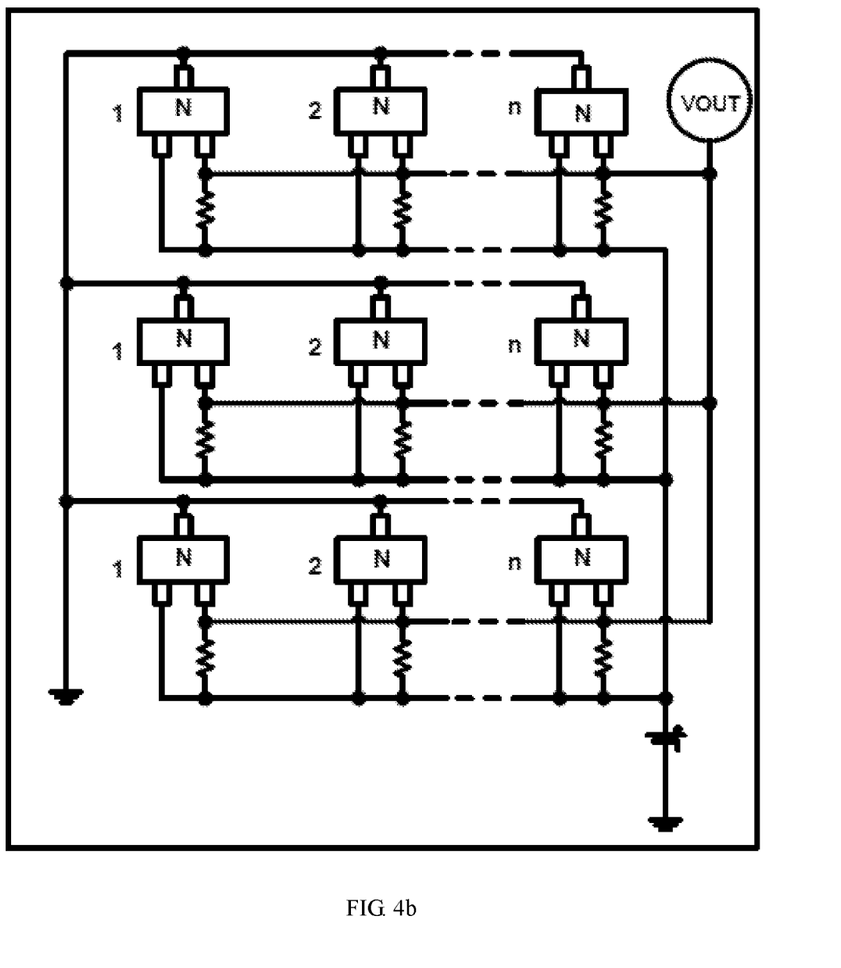
FIG. 4b is a diagram of magnetic sensor chip arrays (only detecting N-pole magnetic fields) in the embodiment of the invention.

FIG. 4a shows the magnetic sensor chip arrays only detecting S-pole magnetic fields. FIG. 4b shows the magnetic sensor chip arrays only detecting N-pole magnetic fields. Wherein, as for the magnetic sensor chip arrays, if no magnetic field passes across the magnetic sensor chip arrays, VOUT=H; and if a magnetic field passes across any one of the magnetic sensor chip arrays, VOUT=L.

Figure 3:
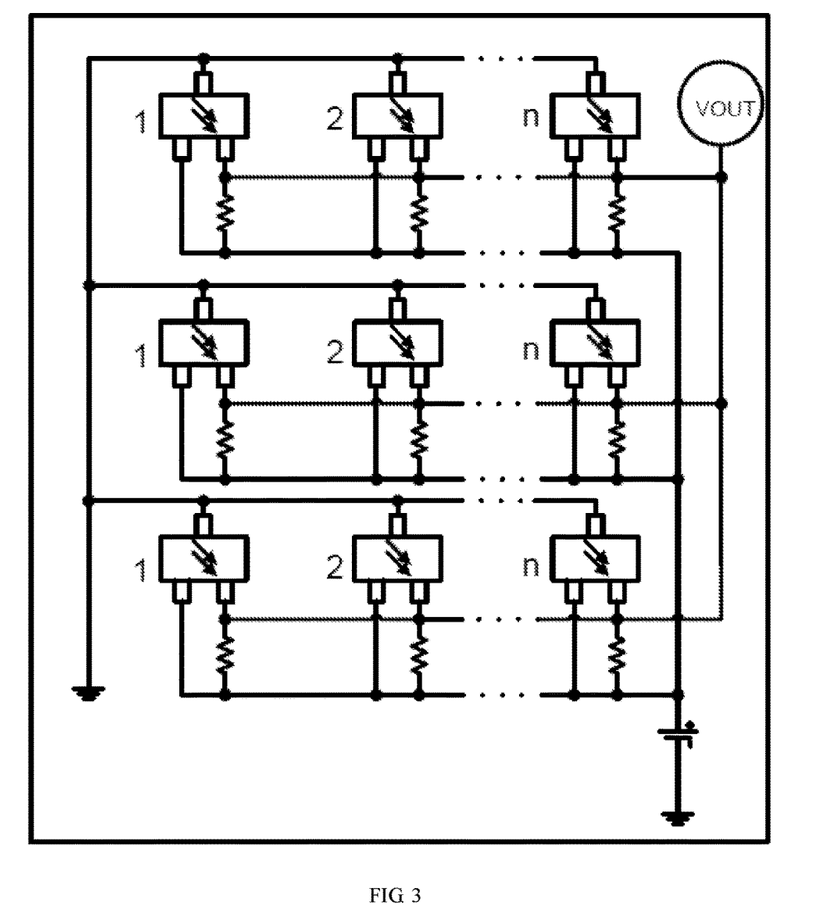
FIG. 3 is a diagram of a photosensitive sensor chip array in the embodiment of the invention.

As for the photosensitive sensor chip array, if it is detected that light above any chip of the photosensitive sensor chip array is shielded, VOUT=L.

The magnetic sensor chips of the first magnetic sensor chip array and the magnetic sensor chips of the second magnetic sensor chip array only allow magnetic force lines in the vertical direction to pass through, which can be realized by installing magnetic force line shielding devices on the magnetic sensor chips. The photosensitive sensor chips of the photosensitive sensor chip array only allow light in the vertical direction to pass through.

Figure 5A:
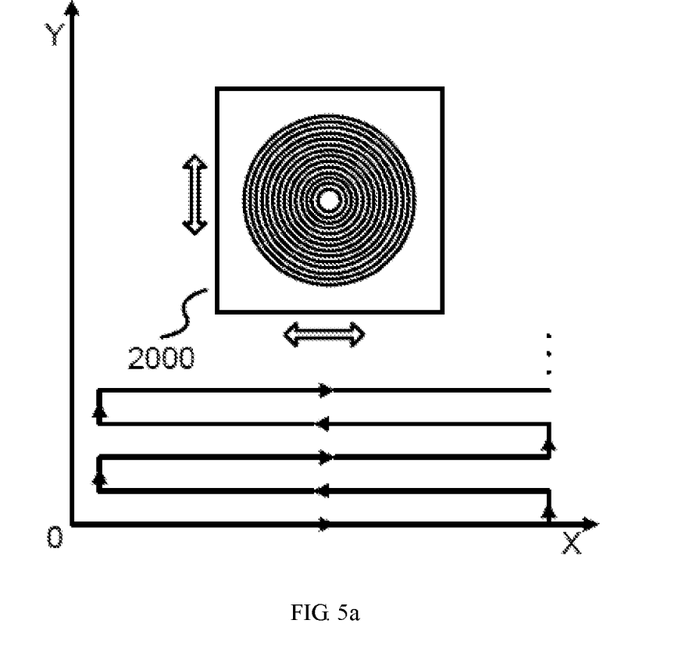
FIG. 5a is a diagram of the moving track of the wireless charging transmitter in the embodiment of the invention.
Figure 5B:
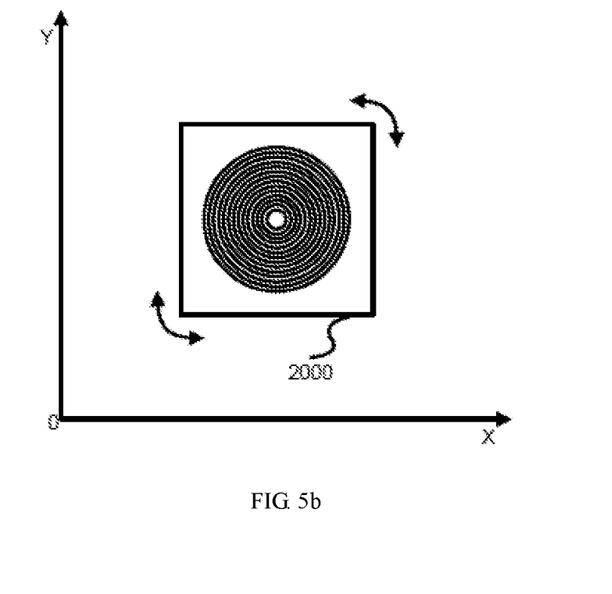
FIG. 5b is a diagram of the rotating track of the wireless charging transmitter in the embodiment of the invention.

The fine-adjustment drive motor 2003 is started to clockwise rotate by 15° to the maximum extent around the center of the wireless charging transmitter 2000. In the rotation process of the fine-adjustment drive motor 2003, if the eighth magnetic sensor chip array 202, the seventh magnetic sensor chip array 204, the sixth magnetic sensor chip array 206 and the fifth magnetic sensor chip array 208 all meet the condition VOUT=L (a low level is output), position matching is completed, and the fine-adjustment drive motor 2003 stops operating. If not all of the eighth magnetic sensor chip array 202, the seventh magnetic sensor chip array 204, the sixth magnetic sensor chip array 206 and the fifth magnetic sensor chip array 208 meet the condition VOUT=L, the fine-adjustment drive motor 2003 returns to the original point and then anticlockwise rotates by 15° to the maximum extent around the center of the wireless charging transmitter 2000. In the rotation process of the fine-adjustment drive motor 2003, if the eighth magnetic sensor chip array 202, the seventh magnetic sensor chip array 204, the sixth magnetic sensor chip array 206 and the fifth magnetic sensor chip array 208 all meet the condition VOUT=L, position matching is completed, and the fine-adjustment drive motor 2003 stops operating. Otherwise, the fine-adjustment drive motor 2003 returns to the original point, and the first drive motor 2001 and the second drive motor 2002 are started again to continue progressive scanning along the track in the X direction and the Y direction. This process is repeated till the eighth magnetic sensor chip array 202, the seventh magnetic sensor chip array 204, the sixth magnetic sensor chip array 206 and the fifth magnetic sensor chip array 208 all meet the condition VOUT=L (a low level is output) to complete position matching; at this moment, the VOUT state of the first magnetic sensor chip array 101, the second magnetic sensor chip array 103, the third magnetic sensor chip array 105 and the fourth magnetic sensor chip array 107 is locked, and the VOUT state of the eighth magnetic sensor chip array 202, the seventh magnetic sensor chip array 204, the sixth magnetic sensor chip array 206 and the fifth magnetic sensor chip array 208 is also locked; the first solenoid 102, the second solenoid 104, the third solenoid 106 and the fourth solenoid 108 are powered off, and the eighth solenoid 201, the seventh solenoid 203, the sixth solenoid 205 and the fifth solenoid 207 are also powered off; and the charging coil 200 is started to transmit energy, the vehicle-mounted receiving coil 100 starts to receive energy. FIG. 5a is a diagram of the moving track of the wireless charging transmitter of the invention. FIG. 5b is a diagram of the rotating track of the wireless charging transmitter in the embodiment of the invention.

In the above process, the first drive motor 2001 and the second drive motor 2002 drive the wireless charging transmitter 2000 to move, and the fine-adjustment drive motor 2003 horizontally fine adjusts and rotates the wireless charging transmitter 2000.

After the automobile is parked, the four corners AA, BB, CC, DD (shown in FIG. 2a) of the vehicle-mounted wireless charging receiver 1000 disposed at the bottom of the automobile approach the four corners AAA, BBB, CCC, DDD (shown in FIG. 2b) of the ground wireless charging system 3000. If the four corners of the vehicle-mounted wireless charging receiver 1000 are completely aligned to and matched with the four corners of the ground wireless charging system 3000, namely AA, BB, CC and DD are located over A, B, C and D, the receiving coil 100, the first magnetic sensor chip array 101, the first solenoid 102, the second magnetic sensor chip array 103, the second solenoid 104, the third magnetic sensor chip array 105, the third solenoid 106, the fourth magnetic sensor chip array 107 and the fourth solenoid 108 will be separately located over the transmitting coil 200, the eighth solenoid 201, the eighth magnetic sensor chip array 202, the seventh solenoid 203, the seventh sensor chip array 204, the sixth solenoid 205, the sixth magnetic sensor chip array 206, the fifth solenoid 207 and the fifth magnetic sensor chip array 208.

Figure 6:
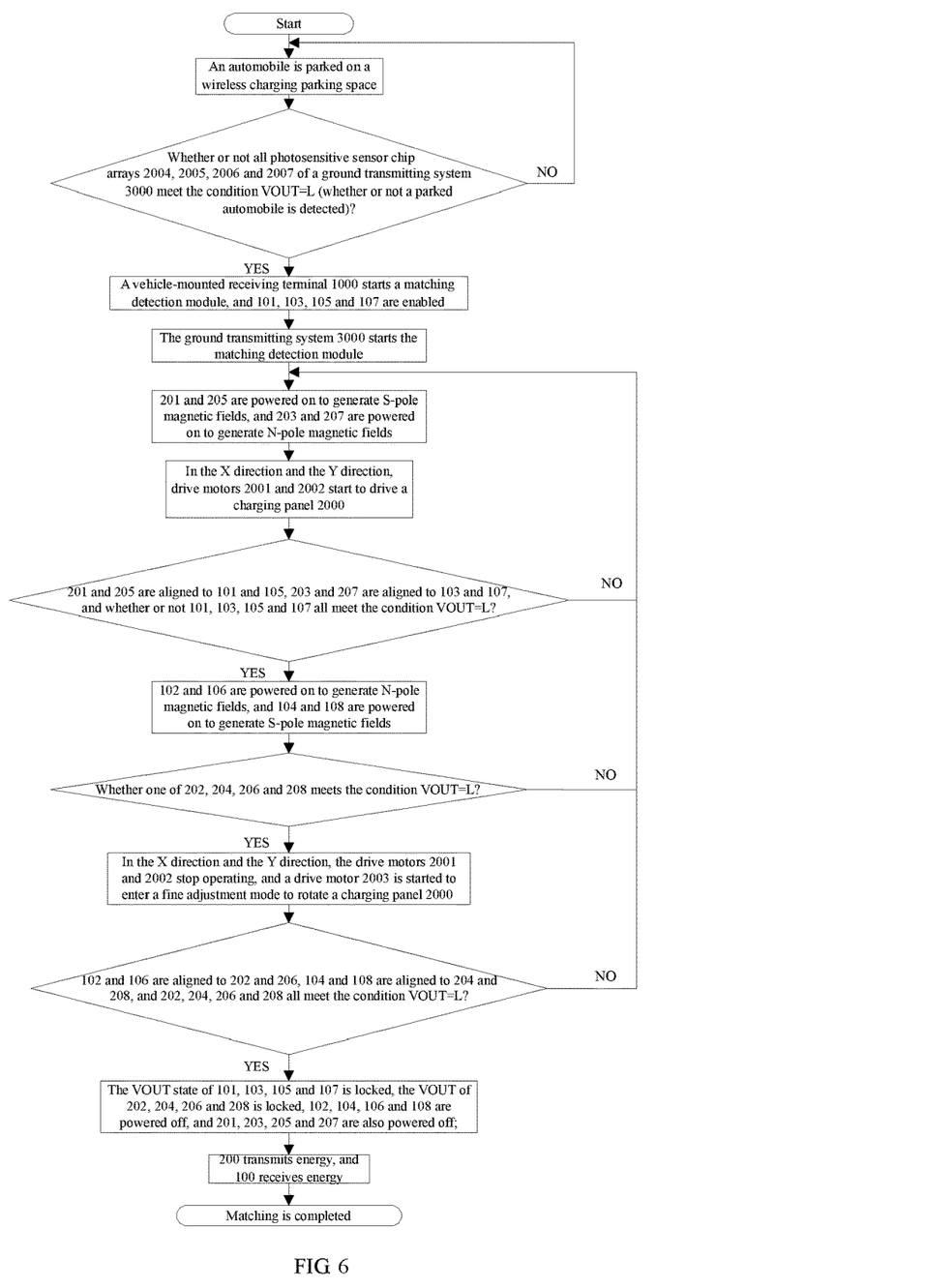
FIG. 6 is a flow diagram of an aligning and matching method for wireless charging of an automobile of the invention.

FIG. 6 shows a flow diagram of an aligning and matching method for wireless charging of an automobile in actual application of the invention. As is shown in FIG. 6, the aligning and matching method for wireless charging of an automobile comprises the following steps:

Step 1, an automobile is parked on the wireless charging parking space;

Step 2, the system detects that the automobile is parked, namely the first photosensitive sensor chip array 2004, the second photosensitive sensor chip array 2005, the third photosensitive sensor chip array 2006 and the fourth photosensitive sensor chip array 2007 all meet the condition VOUT=L;

Step 3, the wireless charging receiver 1000 at the vehicle-mounted receiving terminal starts the aligning detection module, and the first magnetic sensor chip array 101, the second magnetic sensor chip array 103, the third magnetic sensor chip array 105 and the fourth magnetic sensor chip array 107 are enabled;

Step 4, the matching detection module is started;

Step 5, the eighth solenoid 201 and the sixth solenoid 205 are powered on to generate S-pole magnetic fields, and the seventh solenoid 203 and the fifth solenoid 207 are powered on to generate N-pole magnetic fields;

Step 6, in the X direction and the Y direction, the first drive motor 2001 and the second drive motor 2002 start to drive the wireless charging transmitter 2000 to move;

Step 7, the eighth solenoid 201 and the sixth solenoid 205 are aligned to the first magnetic sensor chip array 101 and the third magnetic sensor chip array 105, the seventh solenoid 203 and the fifth solenoid 207 are aligned to the second magnetic sensor chip array 103 and the fourth magnetic sensor chip array 107, and when the first magnetic sensor chip array 101, the second magnetic sensor chip array 103, the third magnetic sensor chip array 105 and the fourth magnetic sensor chip array 107 all meet the condition VOUT=L, Step 8 is performed;

Step 8, the first solenoid 102 and the third solenoid 106 are powered on to generate N-pole magnetic fields, and the second solenoid 104 and the fourth solenoid 108 are powered on to generate S-pole magnetic fields;

Step 9, as long as one of the eighth magnetic sensor chip array 202, the seventh magnetic sensor chip array 204, the sixth magnetic sensor chip array 206 and the fifth magnetic sensor chip array 208 meets the condition VOUT=L, Step 10 is performed;

Step 10, in the X direction and the Y direction, the first drive motor 2001 and the second drive motor 2002 stop operating, and the fine-adjustment drive motor 2003 is started to enter a fine adjustment mode to rotate the wireless charging transmitter 2000;

Step 11, the first solenoid 102 and the third solenoid 106 are aligned to the eighth magnetic sensor chip array 202 and the sixth magnetic sensor chip array 206, the second solenoid 104 and the fourth solenoid 108 are aligned to the seventh magnetic sensor chip array 204 and the fifth magnetic sensor chip array 208, and when the eighth magnetic sensor chip array 202, the seventh magnetic sensor chip array 204, the sixth magnetic sensor chip array 206 and the fifth magnetic sensor chip array 208 all meet the condition VOUT=L, Step 12 is performed;

Step 12, the VOUT state of the first magnetic sensor chip array 101, the second magnetic sensor chip array 103, the third magnetic sensor chip array 105 and the fourth magnetic sensor chip array 107 is locked, the VOUT state of the eighth magnetic sensor chip array 202, the seventh magnetic sensor chip array 204, the sixth magnetic sensor chip array 206 and the fifth magnetic sensor chip array 208 is also locked, the first solenoid 102, the second solenoid 104, the third solenoid 106 and the fourth solenoid 108 are powered off, and the eighth solenoid 201, the seventh solenoid 203, the sixth solenoid 205 and the fifth solenoid 207 are also powered off;

Step 13, the charging coil 200 is started to transmit energy, and the vehicle-mounted receiving coil 100 starts to receive energy;

Step 14, matching is completed.

The invention adopts photosensitive sensors and magnetic sensors to achieve alignment, thereby having the advantage of low operating power consumption in the non-charging state. In addition, photosensitive sensors are used for detecting automobile parking, magnetic sensors are used for positioning, and the stepping motors are controlled to drive the wireless charging transmitting panel on the ground to be automatically aligned to the vehicle-mounted wireless charging receiving panel. Compared with existing aligning methods based on manual control over automobiles, the invention has the advantage of automatic, rapid and accurate alignment.

Although the invention is illustrated and introduced in combination with the preferred embodiment, those skilled in the field would appreciate that various changes of the invention can be made in form and in detail without deviating from the sprit and scope set forth by the claims and all these changes should fall within the protection scope of the invention.

What is claimed is:

1. An aligning and matching system for wireless charging of an automobile, comprising a wireless charging receiver disposed on a lower portion of an electric automobile and a wireless charging transmitter disposed on a ground of a parking area, wherein the wireless charging receiver establishes communication with the wireless charging transmitter within a certain distance, and wireless power transmission is started automatically;

the wireless charging receiver comprises a wireless receiving panel and an aligning detection module; the wireless receiving panel is provided with a receiving coil, the aligning detection module comprises a first magnetic sensor chip array composed of a plurality of magnetic sensor chips and a first solenoid set composed of a plurality of solenoids for generating magnetic fields, and the magnetic sensor chips of the first magnetic sensor chip array and the solenoids of the first solenoid set are disposed around the receiving coil;

the wireless charging transmitter comprises a wireless transmitting panel, a matching detection module and a driving device for driving the wireless transmitting panel to move, wherein the wireless transmitting panel is provided with a transmitting coil, the matching detection module comprises a photosensitive sensor chip array composed of a plurality of photosensitive sensor chips, a second magnetic sensor chip array composed of a plurality of magnetic sensor chips and a second solenoid set composed of a plurality of solenoids for generating magnetic fields; and the wireless transmitting panel is disposed on the driving device and is driven by the driving device to be moved and aligned.

2. The aligning and matching system for wireless charging of an automobile according to claim 1, wherein the first magnetic sensor chip array at least comprises four said magnetic sensor chips separately marked as a first magnetic sensor chip, a second magnetic sensor chip, a third magnetic sensor chip and a fourth magnetic sensor chip, and the first magnetic sensor chip, the second magnetic sensor chip, the third magnetic sensor chip and the fourth magnetic sensor chip are clockwise disposed around the receiving coil; and the first solenoid set at least comprises four said solenoids separately marked as a first solenoid, a second solenoid, a third solenoid and a fourth solenoid, and the first solenoid, the second solenoid, the third solenoid and the fourth solenoid are separately spaced from the first magnetic sensor chip, the second magnetic sensor chip, the third magnetic sensor chip and the fourth magnetic sensor chip.

3. The aligning and matching system for wireless charging of an automobile according to claim 2, wherein the first solenoid and the third solenoid generate magnetic fields of a same polarity, the second solenoid and the fourth solenoid generate magnetic fields of a same polarity, and the first solenoid and the second solenoid generate magnetic fields of different polarities; and the first magnetic sensor chip and the third magnetic sensor chip are used for detecting magnetic fields of a same polarity; and the second magnetic sensor chip and the fourth magnetic sensor chip are used for detecting magnetic fields of a same polarity.

4. The aligning and matching system for wireless charging of an automobile according to claim 1, wherein the second magnetic sensor chip array at least comprises four said magnetic sensor chips separately marked as a fifth magnetic sensor chip, a sixth magnetic sensor chip, a seventh magnetic sensor chip and an eighth magnetic sensor chip, and the fifth magnetic sensor chip, the sixth magnetic sensor chip, the seventh magnetic sensor chip and the eighth magnetic sensor chip are clockwise disposed around the transmitting coil in sequence; and the second solenoid set at least comprises four said solenoids separately marked as a fifth solenoid, a sixth solenoid, a seventh solenoid and an eighth solenoid, and the fifth solenoid, the sixth solenoid, the seventh solenoid and the eighth solenoid are separately spaced from the fifth magnetic sensor chip, the sixth magnetic sensor chip, the seventh magnetic sensor chip and the eighth magnetic sensor chip.

5. The aligning and matching system for wireless charging of an automobile according to claim 4, wherein the fifth solenoid and the seventh solenoid generate magnetic fields of a same polarity, the sixth solenoid and the eighth solenoid generate magnetic fields of a same polarity, and the fifth solenoid and the sixth solenoid generate magnetic fields of different polarities; and the fifth magnetic sensor chip and the seventh magnetic sensor chip are used for detecting magnetic fields of a same polarity, the sixth magnetic sensor chip and the eighth magnetic sensor chip are used for detecting magnetic fields of a same polarity, and the fifth magnetic sensor chip and the sixth magnetic sensor chip are used for detecting magnetic fields of different polarities.

6. The aligning and matching system for wireless charging of an automobile according to claim 1, wherein the photosensitive sensor chip array at least comprises four said photosensitive sensor chips separately marked as a first photosensitive sensor chip, a second photosensitive sensor chip, a third photosensitive sensor chip and a fourth photosensitive sensor chip, and the first photosensitive sensor chip, the second photosensitive sensor chip, the third photosensitive sensor chip and the forth photosensitive sensor chip are disposed around the second magnetic sensor chip array and the second solenoid set.

7. The aligning and matching system for wireless charging of an automobile according to claim 1, wherein the driving device comprises a transverse and longitudinal rail, and the wireless transmitting panel is movably disposed on the transverse and longitudinal rail and is driven by the driving device to transversely and longitudinally move on the transverse and longitudinal rail.

8. The aligning and matching system for wireless charging of an automobile according to claim 1, wherein the driving device comprises a plurality of drive motors separately installed around the wireless transmitting panel.

9. An aligning and matching method for wireless charging of an automobile, comprising the following steps:

step 1, disposing a wireless charging receiver at a bottom of an electric automobile, and disposing a wireless charging transmitter on a ground of a parking area, wherein, the wireless charging receiver comprises a wireless receiving panel and an aligning detection module, the wireless receiving panel is provided with a receiving coil, the aligning detection module comprises a first magnetic sensor chip array composed of a plurality of magnetic sensor chips and a first solenoid set composed of a plurality of solenoids for generating magnetic fields;

the wireless charging transmitter comprises a wireless transmitting panel, a matching detection module and a driving device for driving the wireless transmitting panel to move, the wireless transmitting panel is disposed on the driving device, the wireless transmitting panel is provided with a transmitting coil, the matching detection module comprises a photosensitive sensor chip array composed of a plurality of photosensitive sensor chips, a second magnetic sensor chip array composed of a plurality of magnetic sensor chips and a second solenoid set composed of a plurality of solenoids for generating magnetic fields, and the wireless transmitting panel is disposed on the driving device and is driven by the driving device to be moved and aligned;

the magnetic sensor chips of the first magnetic sensor chip array and the magnetic sensor chips of the second magnetic sensor chip array only allow magnetic force lines in a vertical direction to pass through, and the photosensitive sensor chips of the photosensitive sensor chip array only allow light in a vertical direction to pass through;

step 2, generating magnetic fields by the first solenoid set of the aligning detection module, and generating magnetic fields by the second solenoid set of the matching detection module;

detecting, by the photosensitive sensor chip array, whether or not light is shielded currently;

installing magnetic force line shielding devices on all said magnetic sensor chips, so that only magnetic force lines in the vertical direction are allowed to pass through the magnetic sensor chips;

detecting, by the second magnetic sensor chip array, the magnetic fields generated by the first solenoid set to judge whether or not the second magnetic sensor chip array is in one-to-one correspondence with the first solenoid set of the aligning detection module; and detecting, by the first magnetic sensor chip array, the magnetic fields generated by the second solenoid set to judge whether or not the first magnetic sensor chip array is in one-to-one correspondence with the second solenoid set of the aligning detection module; and step 3, driving the wireless transmitting panel to move by the driving device, and completing aligning when the magnetic sensor chips of the first magnetic sensor chip array are in one-to-one correspondence with the solenoids of the second solenoid set and the magnetic sensor chips of the second magnetic sensor chip array are in one-to-one correspondence with the solenoids of the first solenoid set.

* * * * *